(12) United States Patent
Shirai

(10) Patent No.: US 11,659,303 B2
(45) Date of Patent: *May 23, 2023

(54) IMAGING APPARATUS, CONTROL METHOD OF IMAGING APPARATUS, IMAGING SYSTEM, AND STORAGE MEDIUM

(71) Applicant: CANON KABUSHIKI KAISHA, Tokyo (JP)

(72) Inventor: Kunihiro Shirai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/580,117

(22) Filed: Jan. 20, 2022

(65) Prior Publication Data

US 2022/0150439 A1 May 12, 2022

Related U.S. Application Data

(63) Continuation of application No. 17/196,158, filed on Mar. 9, 2021, now Pat. No. 11,258,974.

(30) Foreign Application Priority Data

Mar. 19, 2020 (JP) .............................. JP2020-049940

(51) Int. Cl.
*H04N 25/772* (2023.01)
*H04N 23/661* (2023.01)
*H04N 23/63* (2023.01)

(52) U.S. Cl.
CPC ......... *H04N 25/772* (2023.01); *H04N 23/661* (2023.01); *H04N 23/631* (2023.01)

(58) Field of Classification Search
CPC .......... H04N 5/37455; H04N 5/23206; H04N 5/232933; H04N 25/772; H04N 23/661;
(Continued)

(56) References Cited

U.S. PATENT DOCUMENTS 7,801,428 B2 * 9/2010 Nagaishi ............... G03B 17/00
348/208.99
8,103,123 B2  1/2012 Vehvilainen
(Continued)

FOREIGN PATENT DOCUMENTS

JP  2003157425 A  5/2003
JP  2003259281 A  9/2003

OTHER PUBLICATIONS

Notice of Allowance issued in U.S. Appl. No. 17/196,158 dated Oct. 18, 2021.

*Primary Examiner* — Ahmed A Berhan
(74) *Attorney, Agent, or Firm* — Rossi, Kimms & McDowell LLP

(57) ABSTRACT

An imaging apparatus is provided. The apparatus comprises a controller configured to transmit an image obtained by an image sensor to an external device via a communication circuit, and cause the external device to execute a predetermined image processing on the image. The controller obtains information indicating recommendation or non-recommendation for the execution of the predetermined image processing on the image by the external device, based on a state of at least one of an imaging optical system and the image sensor when capturing the image, and transmits an execution request for the predetermined image processing on the image to the external device via the communication circuit, if the obtained information indicates the recommendation.

20 Claims, 11 Drawing Sheets

(58) Field of Classification Search
CPC .... H04N 23/631; H04N 23/667; H04N 25/61; H04N 25/611; H04N 23/81
See application file for complete search history.

(56) References Cited

U.S. PATENT DOCUMENTS

| | | | |
|---|---|---|---|
| 10,015,393 B2* | 7/2018 | Sakurai | .................... H04N 5/91 |
| 2016/0275988 A1* | 9/2016 | Kim | ..................... G11B 27/034 |

* cited by examiner

FIG. 6A

|  | BRIGHTNESS 0 | BRIGHTNESS 1 | BRIGHTNESS 2 | BRIGHTNESS 3 |
|---|---|---|---|---|
| EDGE AMOUNT 0 | 0 | 0 | 0 | 0 |
| EDGE AMOUNT 1 | 1 | 1 | 0 | 0 |
| EDGE AMOUNT 2 | 1 | 1 | 0 | 0 |
| EDGE AMOUNT 3 | 1 | 1 | 1 | 0 |

FIG. 6B

|  | FOCAL LENGTH 0 | FOCAL LENGTH 1 | FOCAL LENGTH 2 | FOCAL LENGTH 3 |
|---|---|---|---|---|
| APERTURE 0 | 1 | 1 | 1 | 1 |
| APERTURE 1 | 1 | 1 | 0 | 0 |
| APERTURE 2 | 1 | 0 | 0 | 0 |
| APERTURE 3 | 0 | 0 | 0 | 0 |

| ISO SENSITIVITY 0 | 0 |
|---|---|
| ISO SENSITIVITY 1 | 0 |
| ISO SENSITIVITY 2 | 0 |
| ISO SENSITIVITY 3 | 1 |
| ISO SENSITIVITY 4 | 1 |
| ISO SENSITIVITY 5 | 1 |

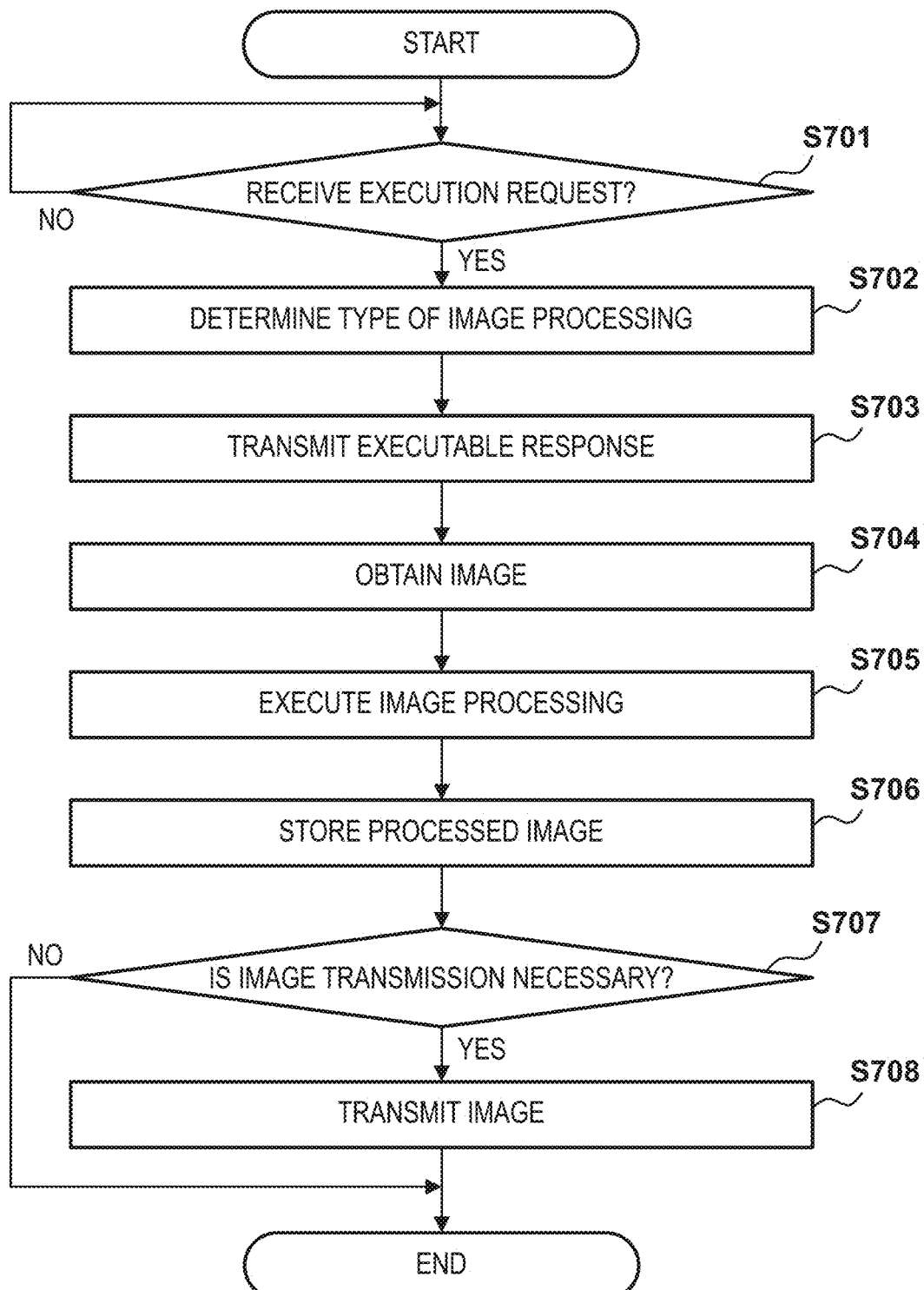

IMAGING APPARATUS, CONTROL METHOD OF IMAGING APPARATUS, IMAGING SYSTEM, AND STORAGE MEDIUM

BACKGROUND OF THE INVENTION

Field of the Invention

The present invention relates to an imaging apparatus, a control method of the imaging apparatus, an imaging system, and a storage medium.

Description of the Related Art

An imaging apparatus such as a digital camera has various image processing functions. However, it is difficult for the imaging apparatus to maintain these image processing functions that are advancing year by year.

Japanese Patent Laid-Open Nos. 2003-259281 and 2003-157425 disclose techniques by which an image captured by an imaging apparatus is transferred to a server across a network and undergoes image processing in the server, and the image having undergone the image processing is returned to the imaging apparatus across the network.

In the above related arts, all images captured by the imaging apparatus are transferred to the server across the network and undergo image processing in the server. However, it is meaningless to apply the image processing to an image that does not improve the image quality even when the image undergoes the image processing. Accordingly, performing the image processing on all images in the same way wastes the cost of communication with the server across the network and the cost of CPU processing in the server in not a few cases. Also, from the viewpoint on the user side, if the server processing is a paid service, a case in which no expected results can be obtained even when the user executes the server processing by paying the cost occurs.

SUMMARY OF THE INVENTION

The present invention provides a technique advantageous in improving the function of image processing at low cost.

The present invention in its one aspect provides an imaging apparatus comprising an image sensor configured to obtain an image formed by an imaging optical system, a communication circuit configured to communicate with an external device capable of executing predetermined image processing in accordance with an execution request, and a controller configured to transmit the image obtained by the image sensor to the external device via the communication circuit, and cause the external device to execute the predetermined image processing on the image, wherein the controller obtains information indicating recommendation or non-recommendation for the execution of the predetermined image processing on the image by the external device, based on a state of at least one of the imaging optical system and the image sensor when capturing the image, and transmits an execution request for the predetermined image processing on the image to the external device via the communication circuit, if the obtained information indicates the recommendation.

Further features of the present invention will become apparent from the following description of exemplary embodiments (with reference to the attached drawings).

BRIEF DESCRIPTION OF THE DRAWINGS

FIGS. 6A to 6C are views showing examples of tables to be looked up in order to obtain the information of recommendation or non-recommendation for the execution of predetermined image processing by the server;

FIG. 7 is a flowchart of a control method related to predetermined image processing by the server;

DESCRIPTION OF THE EMBODIMENTS

Figure 1:
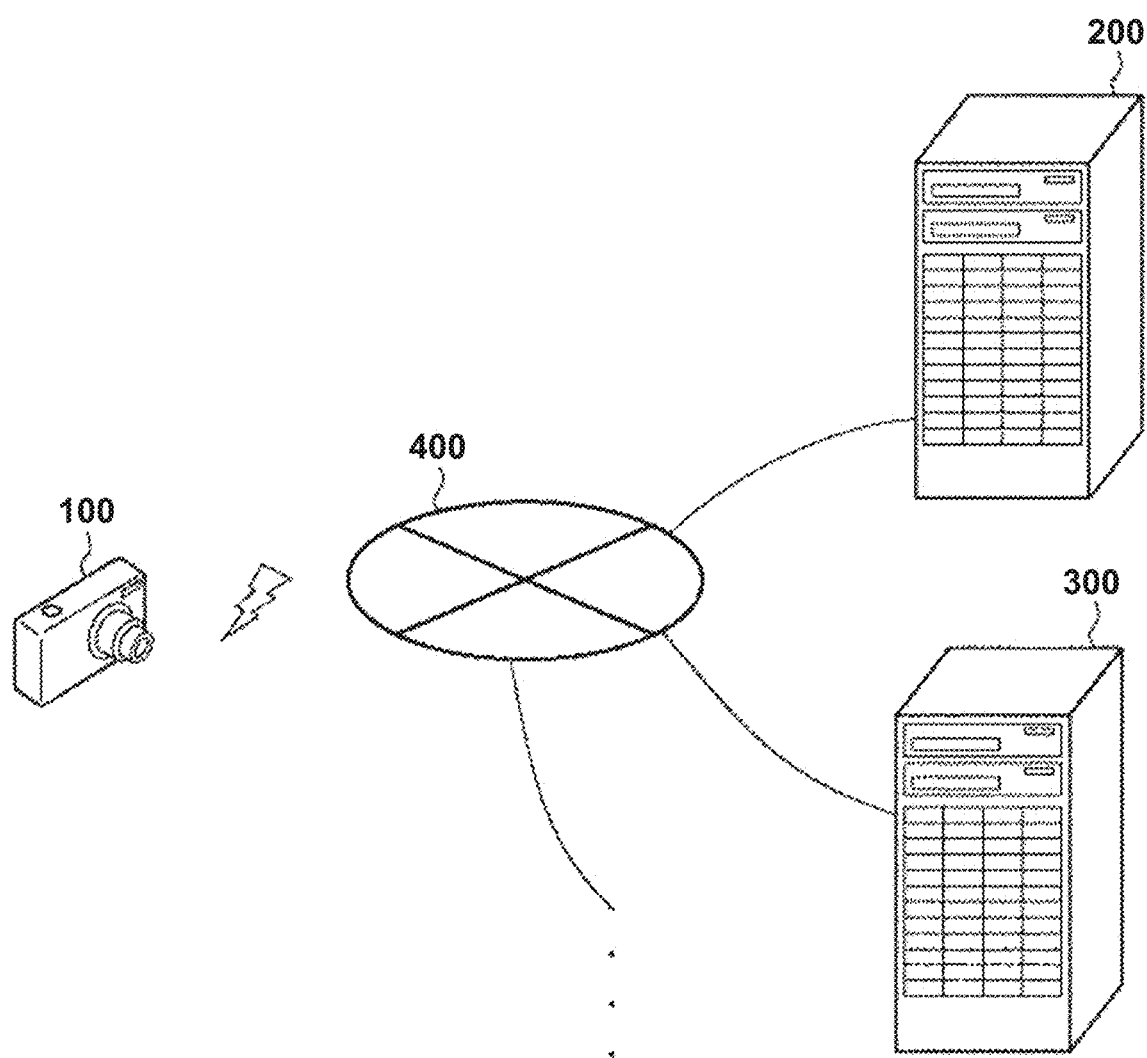
FIG. 1 is a view showing the configuration of an imaging system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<System Configuration>

An imaging system can include an imaging apparatus, and a server capable of communicating with the imaging apparatus and executing predetermined image processing in accordance with an execution request. The imaging apparatus can be one of a digital camera, a portable phone with a camera, a smartphone, a tablet terminal, and a personal computer with a camera. In this embodiment, a digital camera will be explained as an example of the imaging apparatus. The server is an external device for the imaging apparatus, and can be a server that provides a so-called cloud service, that is, can execute predetermined image processing in accordance with an execution request.

FIG. 1 is a view showing the configuration of the imaging system according to the embodiment. The imaging system can include a digital camera 100 as the imaging apparatus, and a server (first server) 200 and a second server 300 as external devices. The digital camera 100, the server 200, and the second server 300 are connected across a network 400 so that they can communicate with each other. This connection across the network 400 can be either wired connection or wireless connection. Also, FIG. 1 shows the arrangement in which the digital camera 100 is communicably connected to the server 200 and the second server 300 across the network 400, but they can also be connected directly without any network. The server 200 and the second server 300 can be so configured as to provide different cloud services. In the present invention, however, the number of servers connectable to the digital camera 100 is not limited to a specific number. To simplify the explanation, a form in which only the server 200 is used as an external device for providing a cloud service to the digital camera 100 will be explained.

Figure 2:
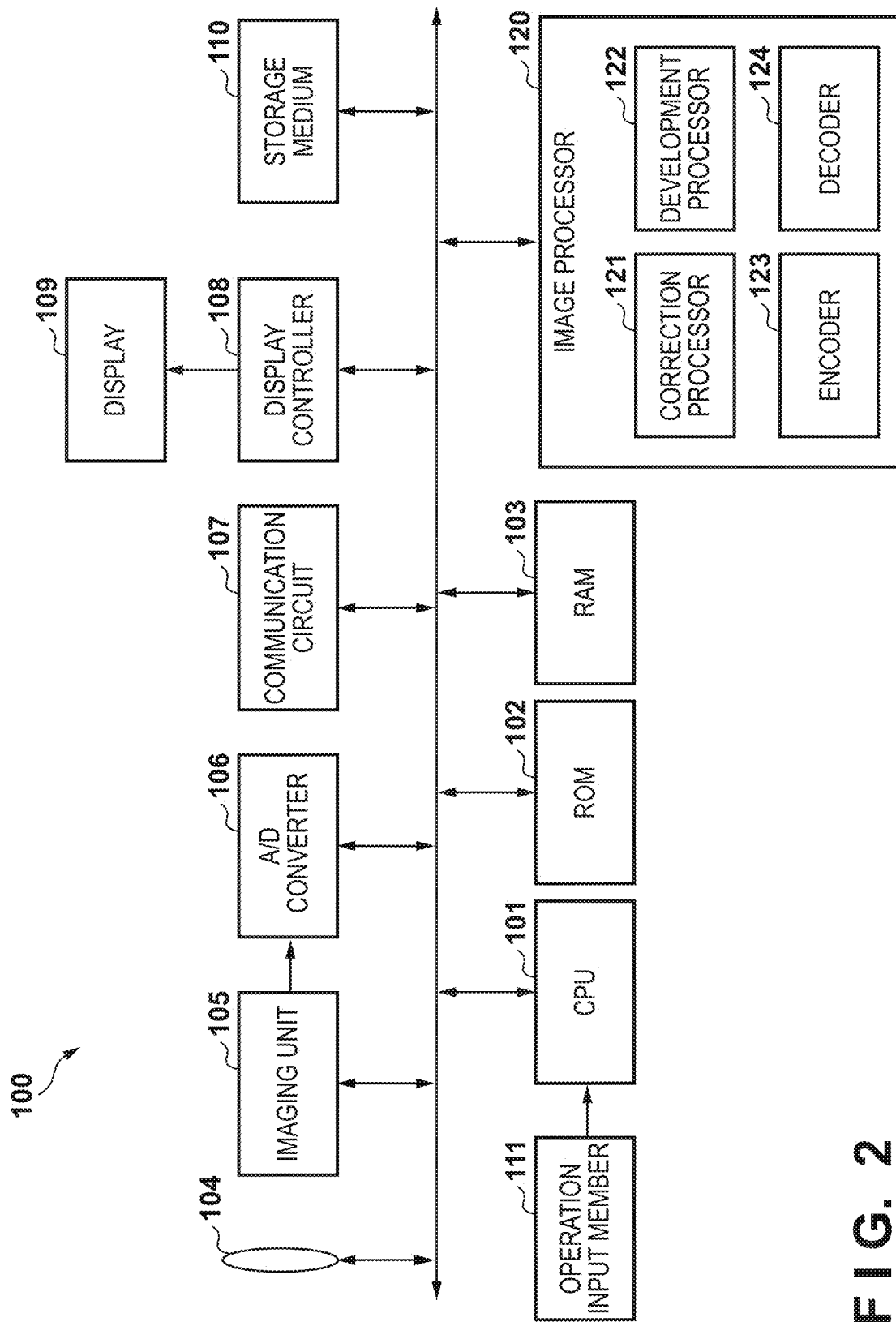
FIG. 2 is a block diagram showing the configuration of a digital camera.

FIG. 2 is a block diagram showing the arrangement of the digital camera 100. A CPU 101 is a controller for controlling the operation of each block of the digital camera 100. More specifically, the CPU 101 controls the operation of each block by deploying, on a RAM 103, a program of an imaging process or a reproducing process stored in a ROM 102, and executing the program.

The ROM 102 stores the programs of the imaging process, the reproducing process, and the like as described above. The ROM 102 can be formed by, for example, a rewritable nonvolatile memory (for example, a flash ROM), and can store parameters, user setting information, and the like necessary for the operation of each block of the digital camera 100. The RAM 103 can provide a work area for a program, and can also store intermediate data output during the operation of each block. The RAM 103 can be formed by a volatile memory.

An imaging unit 105 can include an image sensor such as a CCD or a CMOS sensor. The imaging unit 105 outputs, to an A/D converter 106, an analog image signal obtained by the image sensor by photoelectrically converting an optical image formed on the light receiving surface by an imaging optical system 104. The imaging optical system 104 can include an optical element for forming an object image on the image sensor of the imaging unit 105. The imaging optical system 104 can be either a module integrated with the imaging unit 105 or an interchangeable module. The imaging optical system 104 can include a driver (not shown) for driving the optical element in accordance with an instruction from the CPU 101. The state of the imaging optical system 104 can be stored in the RAM 103.

A communication circuit 107 is a communication interface for communicating with the server 200 and the second server 300 as external devices in accordance with a predetermined protocol. The communication circuit 107 can transmit an execution request as a command for causing the external device to execute image processing, and receive an image processed by the external device.

A display unit 109 is formed by an LCD or the like, and displays an image having undergone predetermined image processing after being output from the A/D converter 106, an image recorded in a storage medium 110, and the like. A display controller 108 controls the display of an image on the display unit 109. The user can confirm image information on the display unit 109.

The storage medium 110 stores an image obtained by imaging, an image having undergone image processing, and the like. The storage medium 110 can be formed as a built-in memory of the digital camera 100, and can also be formed as a recording device such as a memory card or an HDD detachably connected to the digital camera 100.

An operation input member 111 can include user interfaces such as a shutter button, a mode dial, and a menu button. The operation input member 111 can also include a touch panel formed on the display unit 109. The operation input member 111 transmits control signals corresponding to operations performed via these user interfaces to the CPU 101.

An image processor 120 executes predetermined image processing. For example, the image processor 120 executes predetermined processing related to recording or displaying on an image output from the A/D converter 106 by imaging. In image reproduction, the image processor 120 executes predetermined processing for displaying an image read out from the storage medium 110. The image processor 120 can include a correction processor 121, a development processor 122, an encoder 123, and a decoder 124. These units can be formed by different hardware components, and can also be formed by software modules for each of which the image processor 120 loads a program for executing corresponding processing and executes the program.

The correction processor 121 is a module for performing an image correction process. That is, the correction processor 121 is a module for correcting a signal of an image stored in the RAM 103, which is deteriorated by the characteristics of the imaging optical system 104 and/or the imaging unit 105. More specifically, the image quality can deteriorate due to the aberration characteristic in the imaging optical system 104, and can deteriorate due to some defective pixels or the optical characteristics of a filter in the imaging unit 105. The correction processor 121 corrects an image based on pre-obtained deterioration characteristics of the imaging optical system 104 and the imaging unit 105.

The development processor 122 is a module for performing a developing process. Generally, the image sensor of the imaging unit 105 has different color sensitivity characteristics for different pixels. To finally obtain images for ornamental purposes, the development processor 122 performs interpolation between color pixels, and generates final pixel values by taking account of the visual characteristic and the organoleptic characteristic. The development processor 121 can further perform a noise reduction process (to be abbreviated as "NR" in some cases hereinafter) for reducing the noise of an image by averaging pixels.

The encoder 123 is a module for performing an encoding process. More specifically, the encoder 123 executes an encoding process corresponding to the recording file format on an image stored in the RAM 103.

The decoder 124 is a module for performing a decoding process. More specifically, the decoder 124 executes a decoding process corresponding to the recording file format on, for example, a recorded image read out from the storage medium 110.

The image processor 120 can further perform a recording process of recording an image of the recording file format encoded by the encoder 123 into the storage medium 110, and a reproduction control process of controlling the reproduction of an image recorded in the storage medium 110.

Figure 3:
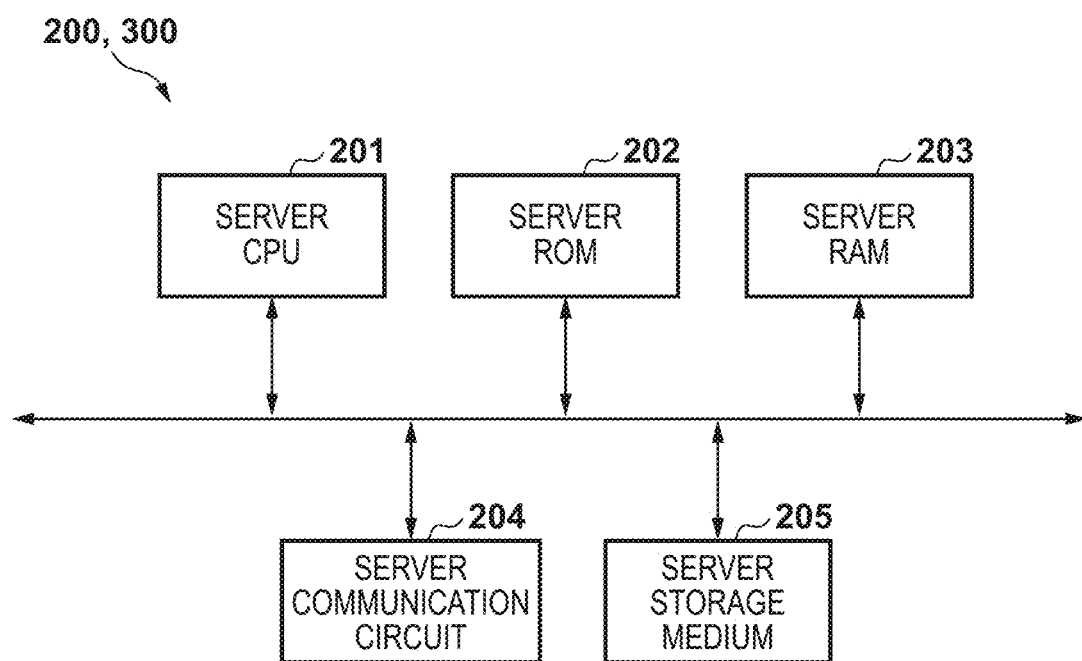
FIG. 3 is a block diagram showing the configuration of a server.

FIG. 3 is a block diagram showing the configuration of the server 200 and the second server 300. An explanation will be made by assuming that the server 200 and the second server 300 have the same configuration, and each server has a function of executing all of the above-described predetermined image processing.

A server CPU 201 controls the operation of each block of the server 200. More specifically, the server CPU 201 controls the operation of each block by deploying a program of predetermined image processing, which is stored in a server ROM 202 or a server storage medium 205, on a server RAM 203, and executing the program. Note that the program is stored in the server ROM 202 in the following explanation.

The server ROM 202 stores the programs of predetermined image processing, and also stores operation parameters and the like necessary for the operation of each block. The server ROM 202 can be formed by, for example, a rewritable nonvolatile memory. The server RAM 203 can provide a work area for a program, and can also store intermediate data output during the operation of each block. The server RAM 203 can be formed by a volatile memory.

A server communication circuit 204 is a communication interface for communicating with the digital camera 100 and the second server 300 in accordance with a predetermined protocol. The server communication circuit 204 can receive an execution request from the digital camera 100, and transmit an image having undergone predetermined image processing to the digital camera 100.

The server storage medium 205 stores a received image, an image having undergone predetermined image processing, and the like. The server storage medium 205 can be a recording device such as an HDD or an SSD.

<Imaging Process>

Instead of causing the image processor 120 to perform predetermined image processing on an image generated by imaging, the CPU 101 can transmit the image to the server 200 via the communication circuit 107 and cause the server 200 to execute predetermined image processing on the image. When performing image processing by the image processor 120, this image processing can be performed by only the operation accuracy of the incorporated image processor 120. On the other hand, the server can flexibly improve and enhance the processing function, so the server can perform image processing enhanced more than that of the image processor 120. However, the effect of image processing by the server changes in accordance with an image to be processed. When the server performs image processing, therefore, it is not always possible to obtain a more significant effect than that in a case in which the image processor 120 performs the processing. If no significant effect can be obtained, it is meaningless to consign image processing to an external device. In this embodiment, therefore, the CPU 101 determines, for each image, whether to consign predetermined image processing to the image processor 120 or the server 200. More specifically, the CPU 101 obtains information indicating recommendation or non-recommendation for the execution of predetermined image processing on an image by the server 200. If the obtained information indicates recommendation for server processing, the CPU 101 transmits an execution request for predetermined image processing on the image to the server 200.

Figure 4:
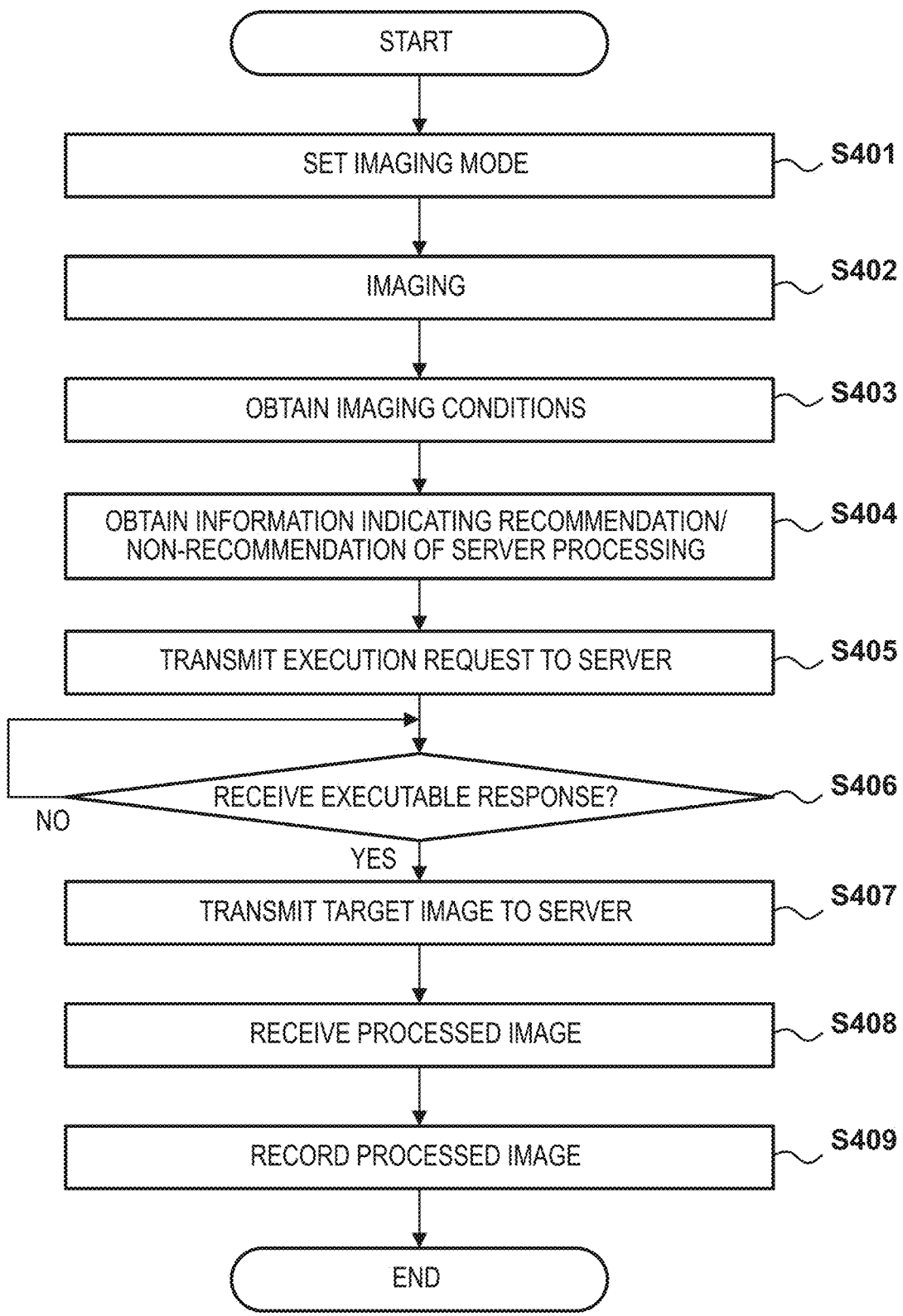
FIG. 4 is a flowchart of a control method of the digital camera.

FIG. 4 is a flowchart of a control method of the digital camera 100 according to the embodiment. A program corresponding to this flowchart is included in the programs stored in the ROM 102 or the like, and executed by the CPU 101 after being loaded into the RAM 103. This control process is started when, for example, the digital camera 100 is activated in a state in which one of a plurality of imaging modes is selected.

In step S401, the CPU 101 sets an imaging mode in accordance with the operation state of the operation input member 111 operated by the user. The setting items of the imaging mode can include, for example, the focal length and aperture (F value) of the imaging optical system 104, the ISO sensitivity of the imaging unit 105, and the shutter speed. Other setting items can include, for example, the presence/absence of the aberration correcting function of the imaging optical system 104, and the presence/absence or strength of the NR function. When the mode dial of the operation input member 111 is set to "auto", the values of these setting items can automatically be determined.

In step S402, in response to pressing of the shutter button of the operation input member 111, the CPU 101 executes an imaging process (imaging) in accordance with the imaging mode set in step S401. Since the set imaging conditions are finally determined after an imaging operation, the CPU 101 obtains the imaging conditions in step S403. The obtained imaging conditions are stored together with an image generated by imaging, as metadata attached to the image, in the storage medium 110. Note that the metadata may also be recorded in the storage medium 110 by a format complying with the standard of an Exif (Exchangeable Image File Format) image file.

Then, in step S404, the CPU 101 obtains information indicating recommendation or non-recommendation for the execution of predetermined image processing by the server 200 on the image obtained by imaging. "Recommendation for the execution of predetermined image processing by the server 200" is to recommend the server 200 to execute predetermined image processing because a significant effect can be obtained if the server 200 performs the predetermined image processing compared to a case in which the image processor 120 performs the processing. On the other hand, "non-recommendation for the execution of predetermined image processing by the server 200" is not to recommend the server 200 to execute predetermined image processing because no significant effect can be expected even if the server 200 performs the predetermined image processing compared to a case in which the image processor 120 performs the processing. In the following explanation, the execution of predetermined image processing by the server will also be called "server processing". The process for obtaining information indicating recommendation or non-recommendation of the server processing will be described later with reference to FIGS. 5 and 6.

In step S405, the CPU 101 transmits an execution request for image processing for which "recommendation" is determined to the server 200 via the communication circuit 107. Image processing to be executed by the server 200 in response to this execution request will be described later with reference to FIG. 7.

In step S406, the CPU 101 waits for an executable response from the server 200. If this executable response is received, the process advances to step S407, and the CPU 101 transmits an image (target image) obtained by imaging and attached metadata to the server 200.

In step S408, the CPU 101 receives an image having undergone the image processing in the server 200. In step S409, the CPU 101 stores the received processed image in the storage medium 110. In this step, the CPU 101 can overwrite the received processed image on the original image received in step S402, and can also record the processed image in another area so that the original image remains.

Note that FIG. 4 shows a procedure in which the processing from step S403 is performed whenever one image is obtained by imaging, but the present invention is not limited to this. For example, it is also possible to use a procedure in which after a plurality of images are generated by continuous imaging and stored in the storage medium 110, the processing from step S403 is executed on each image.

The process of obtaining information of recommendation or non-recommendation in step S404 will now be explained. An aberration correction process that can be one predetermined image processing will be described below. For example, when imaging is performed by a high-performance imaging optical system, no significant effect can generally be expected even when the server 200 performs a development process. In a case like this, therefore, it is unnecessary to cause the server 200 to perform a development process. On the other hand, if the aberration of the imaging optical system 104 is large, the correction processor 121 cannot perform sufficient correction, so it is effective to cause the server 200 to perform correction. Generally, the user cannot determine conditions of the imaging optical system 104 under which aberration occurs, and this makes it necessary to automatically determine the occurrence of aberration.

This applies to NR as well. That is, when the ISO sensitivity is low, the amount of generated noise is small, so a sufficient effect can be expected by the processing of the development processor 122. If the ISO sensitivity is high, however, cases in which no sufficient effect can be obtained by the processing of the development processor 122 increase. Since it is difficult for the user to determine the effect in relation to this point as well, automatic determination is required.

Figure 5:
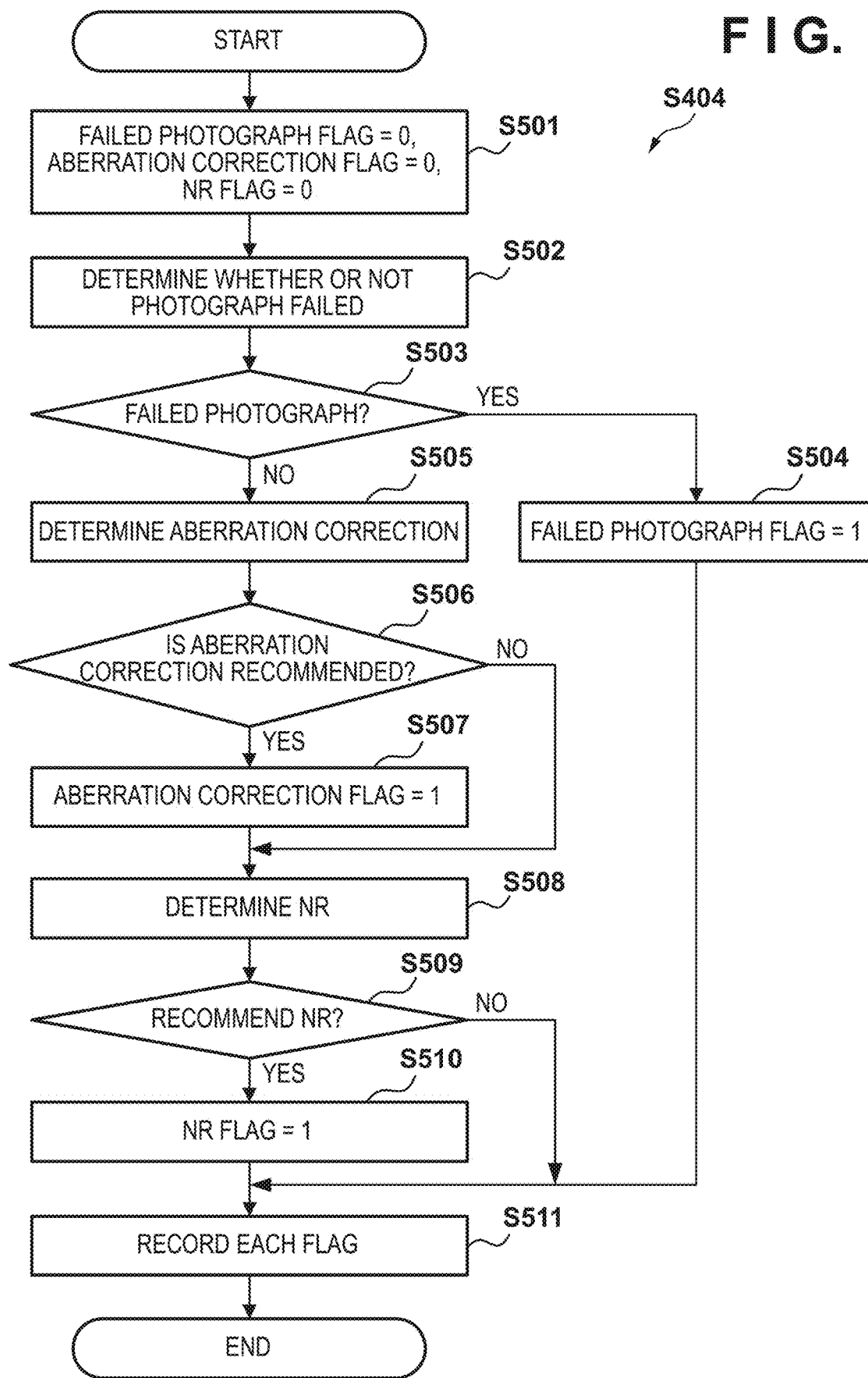
FIG. 5 is a flowchart of a process of obtaining information of recommendation or non-recommendation for the execution of predetermined image processing by the server.

FIG. 5 is a flowchart of the process of obtaining information of recommendation or non-recommendation for the server processing in step S404. In step S404, the process of obtaining information of recommendation or non-recommendation is performed based on the state of at least one of the imaging optical system 104 and the imaging unit 105 when capturing an image.

In step S501, the CPU 101 initializes each flag variable. More specifically, the CPU 101 initializes a failed photograph flag, an aberration correction flag, and an NR flag to 0.

In step S502, the CPU 101 determines whether an image (target image) obtained by imaging is a failed image. For example, if the target image is a clearly overexposed or underexposed image or a completely out-of-focus image, it is no use applying image processing to such an image, so the CPU 101 determines that the target image is a failed image. The CPU 101 can determine that the target image is a failed image based on the luminance value and edge amount of the target image, which are obtained by analyzing the image. For example, a look-up table representing a pre-obtained relationship between the brightness and edge amount of an image and a determination value (failed image/successful image) as shown in FIG. 6A is stored in the ROM 102. In this look-up table shown in FIG. 6A, a determination value representing a failed image is 0, and that representing a successful image is 1.

The CPU 101 analyzes the target image and determines a condition in the look-up table shown in FIG. 6A, to which the target image corresponds. The brightness is represented by, for example, the average of luminance values of the whole target image. The edge amount is represented by the integrated value of a value as the result of application of a predetermined edge extraction filter to the target image. For example, when the target image is almost entirely dark and has almost no edge, the target image is classified as brightness 0 and edge amount 0 in FIG. 6A. In FIG. 6A, a determination value for edge amount 0 and brightness 0 is 0 representing a failed image. In this case, the CPU 101 determines that the target image is a failed image in step S503, and changes the failed photograph flag to 1 in step S504. If the target image is classified as brightness 1 and edge amount 1, the determination value is 1 representing a successful image. In this case, the process advances to step S505. Since the process does not advance to step S504, the failed image determination flag remains 0. As will be described later, the server processing for the target image is "not recommended" if the failed image determination flag is changed to 1. Accordingly, the image is not transmitted to the server 200 or is transmitted to the server 200 but is not processed. Note that the determination result obtained by using the abovementioned look-up table can sometimes differ from a user's intention, so it is also possible to allow the user to change the look-up table.

In step S505, the CPU 101 determines whether the execution of the aberration correction process by the server 200 is recommended or not recommended. This aberration correction can be, for example, peripheral light amount aberration correction, distortion aberration correction, or color aberration correction. The aberration correction may also be a recovery process of recovering image quality deterioration caused by spherical aberration, and the like. The correction processor 121 of the digital camera 100 can perform peripheral light amount correction, distortion aberration correction, color aberration correction, spherical aberration correction, and the like, but cannot perform sufficient correction in some cases for the following reasons. It is difficult to sufficiently perform peripheral light amount correction because the worsening of noise becomes conspicuous if a predetermined correction amount is exceeded. It is sometimes impossible to sufficiently perform distortion aberration correction because deterioration of the resolution increases if the distortion amount is extremely large in the correction. It is sometimes impossible to sufficiently perform color aberration correction if there is no extra pixel in the periphery of an image. In the recovery process, the number of taps of the correction filter of the correction processor 121 restricts the correction accuracy, and the worsening of noise sometimes makes desired intensity correction impossible.

If the correction amount is small, the correction processor 121 of the imaging apparatus 100 can perform sufficient correction in some cases. In reality, however, it is difficult to perform the determination as described above on the user side. Generally, details of the characteristics of the imaging optical system 104 are not disclosed in many cases. In addition, the performance of the correction processor 121 has an influence on the effect of correction.

In this embodiment, the CPU 101 can obtain information indicating recommendation or non-recommendation for the aberration correction process based on the focal length and aperture of the imaging optical system 104 when capturing a target image. The optical characteristic (aberration) of the imaging optical system 104 can vary in accordance with the focal length and the aperture. Therefore, a look-up table representing a pre-obtained relationship between the focal length, the aperture, and a determination value (recommendation/non-recommendation) as shown in FIG. 6B is stored in the ROM 102. In this look-up table shown in FIG. 6B, a determination value representing "recommendation" for the execution of the aberration correction process by the server 200 is 1, and a determination value representing "non-recommendation" is 0. For example, when the aperture and the focal length included in the imaging conditions obtained in step S403 are classified as aperture 0 and focal length 1, the determination value is 1 representing "recommendation". In this case, the CPU 101 determines that the server processing is recommended as the aberration correction process in step S506, and changes the aberration correction flag to 1 in step S507. If it is determined in step S506 that the server processing is not recommended as the aberration correction process, the aberration correction flag remains 0.

Note that one look-up table as shown in FIG. 6B is used for the aberration correction process, but it is also possible to form a look-up table for each of a plurality of aberrations to be corrected. It is also possible to add characteristic values such as the focus position and the pupil distance to variable items, in addition to the focal length and the aperture. Furthermore, a newly developed imaging optical system may be attached to an imaging apparatus using an interchangeable lens system. In this case, it is possible to record a look-up table in an internal ROM of the new imaging optical system, and transfer the look-up table to the ROM 102 of the imaging apparatus 100 when the new imaging optical system is attached.

Then, in step S508, the CPU 101 determines whether the execution of NR process by the server 200 is recommended or not recommended. The NR process is, for example, a process of smoothing noise by average value processing for an image. However, if simple smoothing is performed, the resolution drops at the same time, so there is a method of reducing noise while holding the resolution by various improvements. The development processor 122 of the digital camera 100 cannot reduce noise by a complicated algorithm in some cases. In a case like this, better results are often obtained by transferring the image onto the server and performing the NR process. On the other hand, if noise is not much produced in an image because the ISO sensitivity is low in the imaging conditions, a sufficient effect is sometimes obtained by the processing in the development processor 122. This condition can change in accordance with the characteristics of the digital camera or the characteristics of the development processor 122, so it is difficult for the user to determine the condition.

In this embodiment, therefore, the CPU 101 can obtain information indicating recommendation or non-recommendation for the server processing as the NR process based on the ISO sensitivity of the imaging unit 105 when capturing a target image. For example, a look-up table representing a pre-obtained relationship between the ISO sensitivity and a determination value (recommendation/non-recommendation) as shown in FIG. 6C is stored in the ROM 102. In this look-up table shown in FIG. 6C, a determination value representing "recommendation" for the execution of the NR process by the server 200 is 1, and a determination value representing "non-recommendation" is 0. For example, if the ISO sensitivity included in the imaging conditions obtained in step S403 is classified as ISO sensitivity 3, the determination value is 1 representing "recommendation". In this case, the CPU 101 determines that the server processing is recommended as the NR process in step S509, and changes the NR flag to 1 in step S510. If it is determined in step S509 that the server processing is not recommended as the NR process, the NR flag remains 0.

In the above processing, each of the failed photograph flag, the aberration correction flag, and the NR flag reflects information indicating whether to recommend the execution of predetermined image processing by the server 200. In step S511, the CPU 101 records the values of the failed photograph flag, the aberration correction flag, and the NR flag in, for example, metadata of the target image.

Note that the processing in step S404 may also be performed by the server 200. A mode like this will be described later in the second embodiment.

<Execution Request>

By the processing in step S404 described above, the information indicating recommendation/non-recommendation for the server processing is obtained for each image processing. In step S405, therefore, the CPU 101 checks the value of each flag recorded in the metadata of the target image. If at least one of the aberration correction flag and the NR flag is 1, the CPU 101 transmits an execution request to the server 200. This execution request can include a field for specifying the type (aberration correction process/NR process) of image processing the execution of which is requested. If the failed photograph flag is 1, the CPU 101 does not transmit any execution request to the server 200. If both the aberration correction flag and the NR flag are 0, the CPU 101 does not transmit any execution request to the server 200. When no execution request is transmitted to the server 200, the image processor 120 can perform predetermined image processing, for example, automatically or in accordance with a user's operation instruction.

The execution request can also include a return necessity field describing a designation of the necessity of return of an image from a server having executed image processing on the image. For example, if the user wants to confirm what kind of image processing is executed by the server on an image to be reproduced (displayed), a designation of "return necessary" can be described in the return necessity field by a user's operation. If the user does not want confirmation like this, he or she can describe a designation of "return unnecessary" in the return necessity field. In this case, no image is received in step S408.

<Image Processing by Server>

FIG. 7 is a flowchart of a control method related to the execution of predetermined image processing by the server 200. A program corresponding to this flowchart is included in the programs stored in, for example, the server ROM 202, loaded into the server RAM 203, and then executed by the server CPU 201. An explanation will be made by assuming that this control process is started, for example, after the server 200 is activated, and repetitively executed.

In step S701, the server CPU 201 waits until an execution request (see step S405) is received from the digital camera 100 via the server communication circuit 204. If the execution request is received, the server CPU 201 stores the execution request in the server RAM 203. In step S702, the server CPU 201 determines requested image processing by reading out the type of image processing (the aberration correction process/the NR process) contained in the execution request.

In step S703, the server CPU 201 confirms that the server 200 is capable of executing the requested image processing, and transmits an executable response to the digital camera 100 via the server communication circuit 204. As described earlier, in response to the reception of this executable response (step S406), the digital camera 100 transmits a target image and metadata (step S407). In step S704, the server CPU 201 receives (obtains) the target image and the metadata. The received target image and metadata are temporarily stored in the server RAM 203.

In step S705, the server CPU 201 reads out the program of the image processing determined in step S702 from the server ROM 202, loads the program into the server RAM 203, and executes the image processing on the target image stored in the server RAM 203. In step S706, the server CPU 201 temporarily stores the image having undergone the image processing in the server RAM 203. In this step, the server CPU 201 may also store the image having undergone the image processing in the server storage medium 205. Also, the server CPU 201 additionally writes, in the metadata, a history indicating that the server 200 has executed the image processing having the type determined in step S702.

In step S707, the server CPU 201 checks whether the value of the return necessity field of the execution request indicates "return necessary". If the value of the return necessity field of the execution request is "return necessary", the server CPU 201 transmits the processed image to the digital camera 100 in step S708.

<Reproduction and Display>

The CPU 101 can display, on the display unit 109, an image selected from one or more images stored in the storage medium 110. In this case, the images stored in the storage medium 110 can have different histories of the application of image processing. That is, the images stored in the storage medium 110 can include both an image processed by the server and an unprocessed image. More specifically, the images stored in the storage medium 110 can have the following states:

A. Server processing "not recommended"

B. Server processing "recommended", but unprocessed by server

C. Server processing "recommended", and processed by server

Accordingly, it is desirable to allow the user to easily confirm the history when an image is displayed. In this embodiment, therefore, the display 109 displays an image, and also displays information indicating recommendation or non-recommendation and information representing the history of server processing in relation to the image.

Figure 8A:
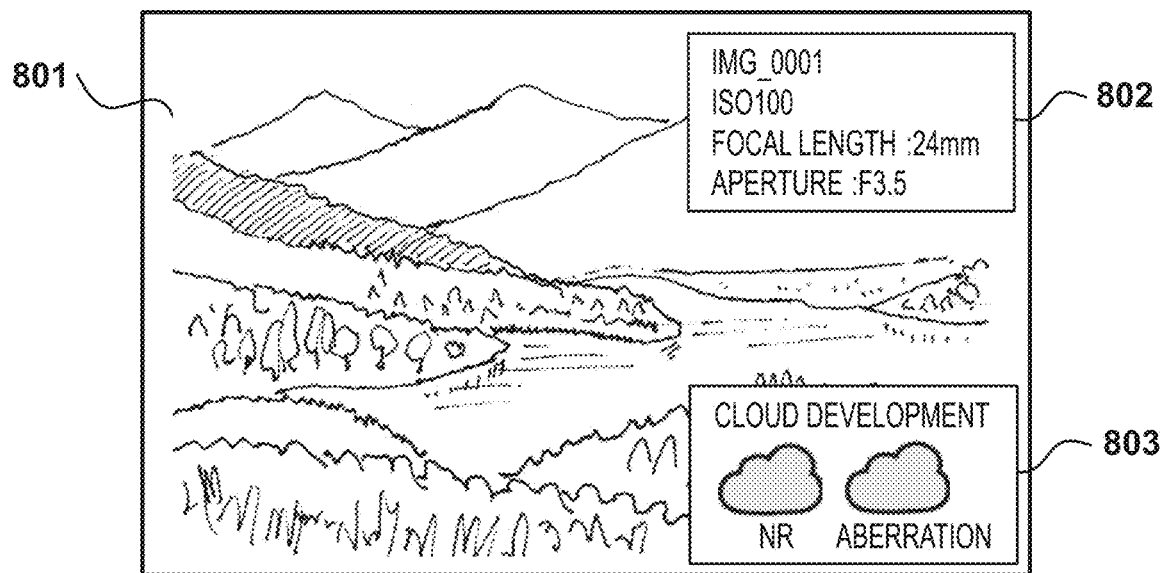
FIGS. 8A to 8D are views showing image display examples on a display.

FIGS. 8A to 8D show examples of image display modes on the display unit 109. Referring to FIG. 8A, an image 801 selected by the user is displayed in a reduced scale matching the size of the display unit 109. The reduction ratio increases depending on the size of the display unit 109, so it is sometimes difficult for the user to grasp the effect of applied image processing by only watching the image. A window 802 displays the imaging conditions of the image 801. Items to be displayed in the window 802 can be items selected by the user, and can also be items used to determine recommendation/non-recommendation of server processing. A window 803 displays the history of server processing (cloud development) for the image 801.

Figure 8B:
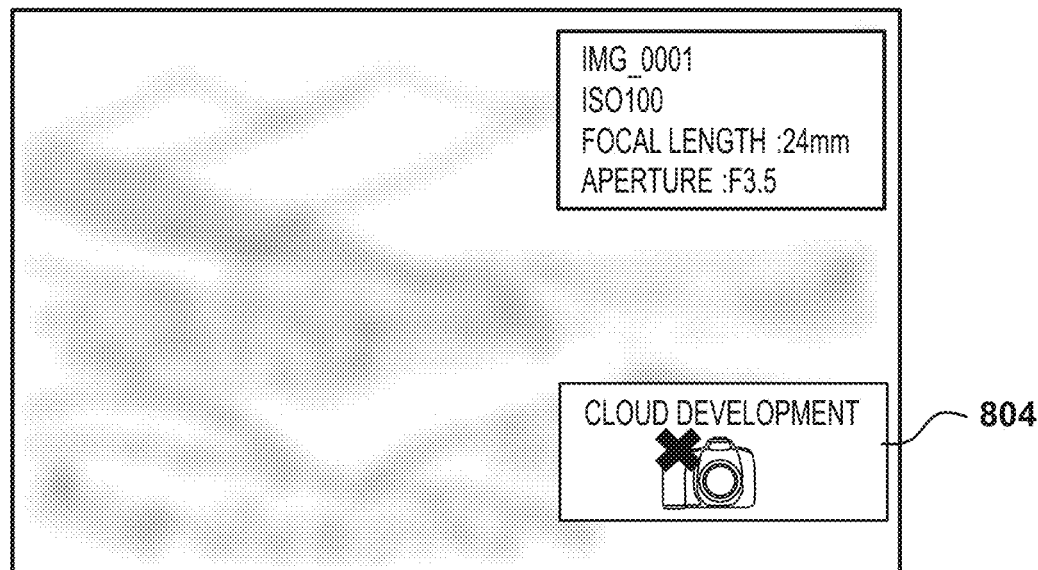

FIG. 8B is a display example when an image in the above-described state A (server processing "not recommended") is selected. FIG. 8B shows an example of a completely out-of-focus photograph, as an example in which server processing (cloud development) is not recommended. In this case, no effective edge is detected from the image, so the image is found to be a failed photograph. For an image like this, an icon 804 indicating that the image is found to be a failed photograph is displayed.

Figure 8C:
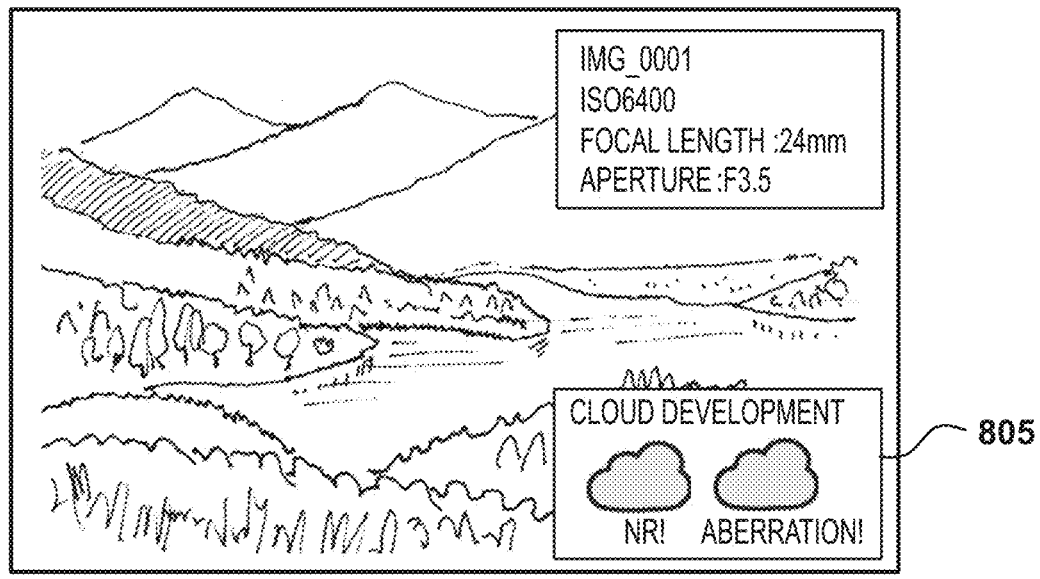

FIG. 8C is a display example when an image in the above-described state B (server processing "recommended", but unprocessed by server) is selected. In this case, an icon 805 indicating that server processing (cloud development) is recommended for each image processing but the cloud development has not been performed yet.

Figure 8D:
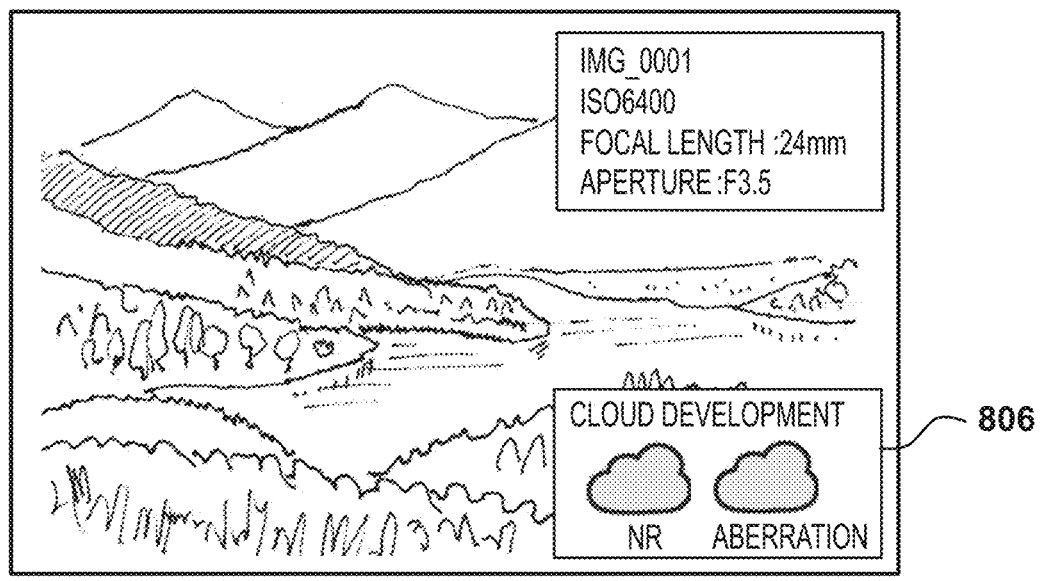

FIG. 8D is a display example in which an image in the above-described state C (server processing "recommended", and processed by server) is selected. In this case, an icon 806 indicating that the server processing (cloud development) is found to be effective and the cloud development has already been performed is displayed.

As described above, the history of server processing is displayed when reproducing an image, so the user can intuitively understand the state of the displayed image. Note that image display in a mode like this may also be performed by an application on an apparatus (for example, a personal computer) different from an imaging apparatus (the digital camera 100).

Second Embodiment

In the above-described first embodiment, the determination of recommendation/non-recommendation of server processing is performed by using the look-up tables (FIGS. 6A to 6C) recorded in the ROM 102 of the digital camera 100. However, image processing on the server side has the advantage that the processing can be improved to high-performance processing by update, so the performance can become better than that when the look-up tables were recorded in the ROM 102. Although the look-up tables recorded in the ROM 102 can also be updated, it is difficult to follow improved image processing by this method.

In this embodiment, the determination of recommendation/non-recommendation of server processing can also be performed on the server side.

Figure 9:
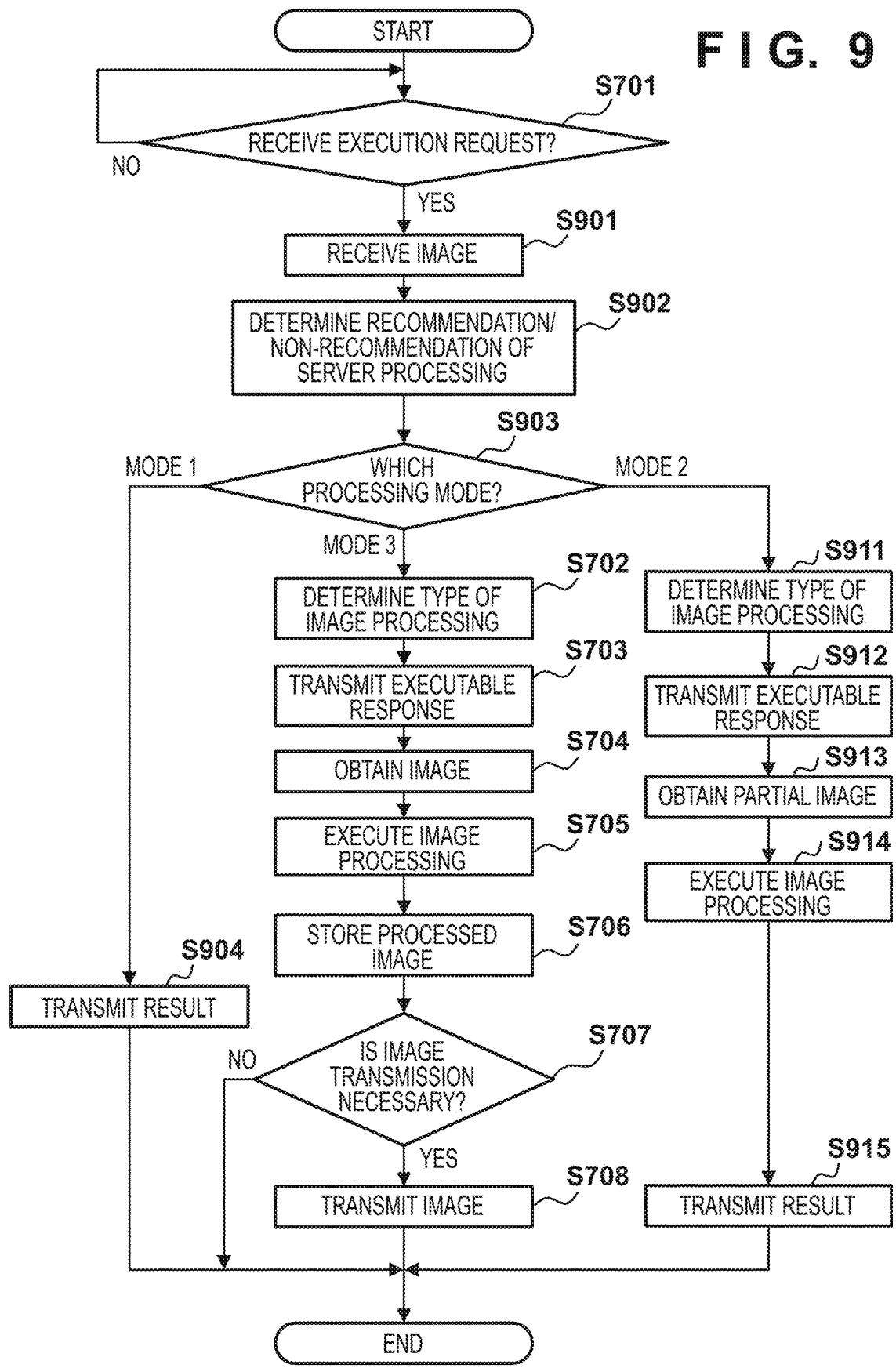
FIG. 9 is a flowchart of a control method related to predetermined image processing by the server.

FIG. 9 is a flowchart of a control method for the execution of predetermined image processing by a server 200 in the second embodiment. A program corresponding to this flowchart is included in programs stored in, for example, a server ROM 202, loaded into a server RAM 203, and executed by a server CPU 201. An explanation will be made by assuming that this control process is started, for example, after the server 200 is activated, and repetitively executed.

Processing on the server of this embodiment will be explained with reference to FIG. 9. Steps S701 to S708 in FIG. 9 are the same as those in FIG. 7, so an explanation thereof will be omitted. In this embodiment, however, processing steps S901 to S903 are inserted between steps S701 and S702. Step S902 is a process of determining recommendation/non-recommendation of server processing, and equivalent to the processing (step S404) performed by a digital camera 100 in the first embodiment. Step S903 is a process of determining a processing mode to be executed by the server. For example, the server 200 has three processing modes 1, 2, and 3. The digital camera 100 can select the processing mode of the server, and can add a designation of an operation mode of the server to an execution request.

Mode 1 is a processing mode that provides only the determination result of recommendation/non-recommendation of server processing for each image processing. Generally, maintenance, management, and rental of the server consume cost, so a server development process is often provided as a service to be charged in accordance with the processing amount. However, the user wants to avoid paying fare to less effective server processing. When selecting mode 1 in a case like this, the user can obtain only the information of recommendation/non-recommendation of server processing for each image processing by an extremely low server load. The user can confirm the information obtained in mode 1, and input an execution request by designating another mode (for example, mode 2) after that.

Mode 2 is a processing mode that simply performs image processing in the server. Mode 2 is effective when the user wants to determine the effect of server image processing by checking processed images as many as possible in a system in which the user is charged for the image processing in accordance with the number of images. In mode 2, the server performs image processing in only a partial region of a target image, and transmits the result. For example, the server performs image processing in a partial region designated by the user or a partial region near a focus frame where the possibility of the existence of a main object is high, and transmits the processed image and the determination result of recommendation/non-recommendation to the digital camera 100. Consequently, the user can confirm the actual processed image, although the image is a part of the region, together with the determination result. After that, the user can designate, for example, mode 2, and input an execution request.

Mode 3 is a processing mode that performs image processing on a whole target image and transmits the result as shown in FIG. 7. Note that mode 3 may also be a processing mode that, for example, determines the amount (for example, large, medium, and small) of the effect of server processing, and automatically performs the server processing if the determination result satisfies a predetermined condition. In mode 3 like this, the user need not request the server to perform processing for the purpose of determination unlike in modes 1 and 2, and can apply server processing to a target image at once.

In step S901, the server CPU 201 receives a target image and its metadata from the digital camera 100. In step S902, the server CPU 201 determines recommendation/non-recommendation of server processing for the target image in accordance with the procedure as shown in FIG. 5. In this case, the look-up tables as shown in FIGS. 6A to 6C are stored in the server ROM 202, and the server CPU 201 performs the determination by using these look-up tables. Note that the server can accurately determine the result of image processing, and hence can also additionally determine an expected effect amount (for example, large, medium, or small) In this case, it is necessary to separately form a look-up table corresponding to the amounts (for example, large, medium, and small) of an effect.

In step S903, the server CPU 201 determines the processing mode designated in the execution request. If the determined processing mode is mode 1, the process advances to step S904. If the determined processing mode is mode 2, the process advances to step S911. If the determined processing mode is mode 3, the process advances to step S702.

In step S904 in mode 1, the server CPU 201 transmits information (the values of a failed photograph flag, an aberration correction flag, and an NR flag) of recommendation/non-recommendation of server processing for a target image, as the determination result in step S902, to the digital camera 100. Since only this information is transmitted in mode 1, the load on the server can be minimized.

In step S911 in mode 2, the server CPU 201 determines the requested image processing by reading out the type of image processing contained in the execution request. In step S912, the server CPU 201 confirms that the server 200 can execute the requested image processing, and transmits an executable response to the digital camera 100 via a server communication circuit 204. In response to the reception of this executable response, the digital camera 100 transmits a partial image as an image of a partial region designated in the target image by the user. In step S913, the server CPU 201 receives this partial image. The received partial image is temporarily stored in the server RAM 203. In step S913, it is also possible to obtain a partial region of the image received in step S901, as an image of a partial region near the focus frame where the possibility of the existence of a main object is high, instead of receiving the partial region transmitted from the digital camera 100.

In step S914, the server CPU 201 reads out the program of the image processing determined in step S911 from the server ROM 202, loads the program into the server RAM 203, and executes the image processing on the partial image stored in the server RAM 203. In step S915, the server CPU 201 transmits information of recommendation/non-recommendation of server processing for the target image in step S902, and a partial image having undergone the image processing performed in step S914, to the digital camera 100.

If it is determined in step S903 that the processing mode is mode 3, processes in steps S702 to S708 are executed. An explanation of these processes will be omitted. In step S708, however, the server CPU 201 transmits the processed image, together with the information of recommendation/non-recommendation of server processing for the target image in step S902, to the digital camera 100.

Figure 10:
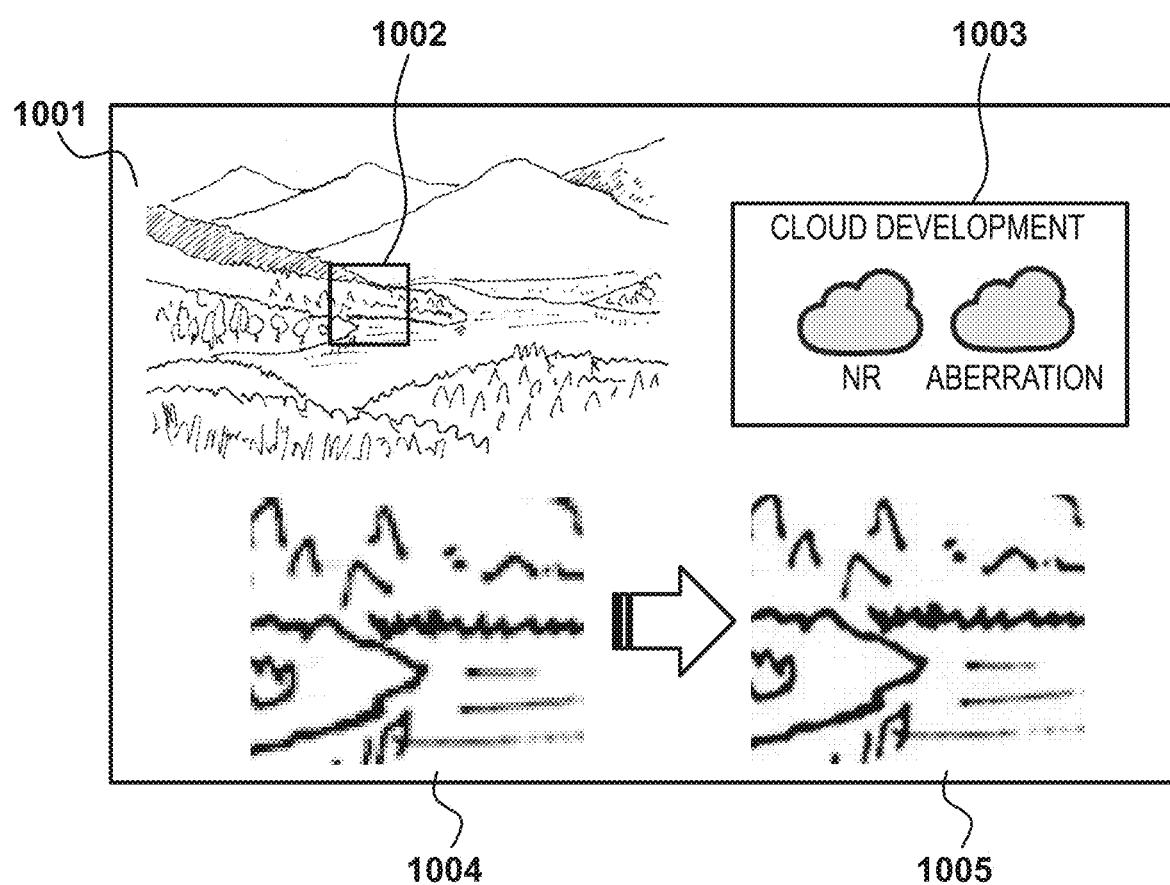
FIG. 10 is a view showing an image display example on the display unit.

FIG. 10 shows an example of a display mode on a display unit 109 of the digital camera 100 when displaying a partial image obtained in mode 2. A screen 1001 displays the whole target image. A frame 1002 displayed on this whole image indicates the region of the partial image. A window 1003 displays the history of server processing performed on the partial image in the frame 1002. In this example shown in FIG. 10, the window 1003 shows that the server has already performed both the NR process and the aberration correction process.

A screen 1004 displays the partial image in the frame 1002 before the server processing in an enlarged scale. A screen 1005 displays the partial image in the frame 1002 after the server processing in an enlarged scale. Since the partial image before the server processing and the partial image after the server processing are displayed adjacent to each other, the user can easily confirm the effect of the server processing.

In the second embodiment explained above, the user can efficiently confirm the effect of server processing even in a paid server system.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-049940, filed Mar. 19, 2020, which is hereby incorporated by reference herein in its entirety.

What is claimed is:

1. An imaging apparatus comprising:
   an image sensor configured to obtain an image formed by an imaging optical system;
   a communication circuit configured to communicate with an external device capable of executing predetermined image processing in accordance with an execution request; and a controller configured to transmit the image obtained by the image sensor to the external device via the communication circuit, and cause the external device to execute the predetermined image processing on the image, wherein the controller obtains information indicating recommendation or non-recommendation for the execution of the predetermined image processing on the image by the external device, and causes a display unit to display an indicator, wherein the indicator is based on the obtained information.

2. The apparatus according to claim 1, wherein the predetermined image processing includes an aberration correction process for the image, and
the controller obtains the information indicating recommendation or non-recommendation for the aberration correction process based on a focal length and aperture of the imaging optical system when capturing the image.

3. The apparatus according to claim 1, wherein the predetermined image processing includes a noise reduction process for the image, and
the controller obtains the information indicating recommendation or non-recommendation for the noise reduction process based on an ISO sensitivity of the image sensor when capturing the image.

4. The apparatus according to claim 1, wherein the controller further obtains the information indicating recommendation or non-recommendation based on a luminance value and edge amount of the image, which are obtained by analyzing the image.

5. The apparatus according to claim 1, further comprising a memory configured to store the image and metadata attached to the image,
wherein the metadata contains the information indicating recommendation or non-recommendation.

6. The apparatus according to claim 1, further comprising a memory configured to store the image and metadata attached to the image,
wherein the metadata contains a history of execution of the predetermined image processing by the external device.

7. The apparatus according to claim 1, wherein the controller causes the display unit to display the image and the information indicating recommendation or non-recommendation together.

8. The apparatus according to claim 1, wherein
the indicator includes a first indicator indicating recommendation for the execution of the predetermined image processing on the image and a second indicator indicating non-recommendation for the execution of the predetermined image processing on the image, and
the controller causes the display unit to selectively display the first or second indicator based on the obtained information.

9. The apparatus according to claim 1, wherein
the indicator includes a first indicator indicating that the external device has not completed the predetermined image processing on the image and a second indicator that the external device has completed the predetermined image processing on the image, and
the controller causes the display unit to selectively display the first or second indicator.

10. The apparatus according to claim 1, wherein
the indicator includes a first indicator indicating recommendation for the execution of the predetermined image processing on the image and a second indicator indicating non-recommendation for the execution of the predetermined image processing on the image, and
the first indicator includes a third indicator indicating that the external device has not completed the predetermined image processing on the image and a fourth indicator that the external device has completed the predetermined image processing on the image.

11. The apparatus according to claim 1, wherein
the predetermined image processing includes a plurality of types of image processing, and
the controller causes the display unit to display the indicator for each type of image processing.

12. The apparatus according to claim 1, wherein
the predetermined image processing includes a plurality of types of image processing, and
the controller causes the display unit to display the indicators for the plurality of types of image processing together.

13. The apparatus according to claim 1, wherein the controller obtains the information indicating recommendation or non-recommendation based on a state of at least one of the imaging optical system and the image sensor when capturing the image.

14. An imaging apparatus comprising:
an image sensor configured to obtain an image formed by an imaging optical system;
a communication circuit configured to communicate with an external device capable of executing predetermined image processing in accordance with an execution request; and
a controller configured to transmit the image obtained by the image sensor to the external device via the communication circuit, and cause the external device to execute the predetermined image processing on the image,
wherein the controller obtains information indicating recommendation or non-recommendation for the execution of the predetermined image processing on the image by the external device, and
transmits an execution request for the predetermined image processing on the image to the external device via the communication circuit, if the obtained information indicates the recommendation.

15. The apparatus according to claim 14, wherein
the predetermined image processing includes an aberration correction process for the image, and
the controller obtains the information indicating recommendation or non-recommendation for the aberration correction process based on a focal length and aperture of the imaging optical system when capturing the image.

16. The apparatus according to claim 14, wherein
the predetermined image processing includes a noise reduction process for the image, and
the controller obtains the information indicating recommendation or non-recommendation for the noise reduction process based on an ISO sensitivity of the image sensor when capturing the image.

17. The apparatus according to claim 14, wherein the controller further obtains the information indicating recommendation or non-recommendation based on a luminance value and edge amount of the image, which are obtained by analyzing the image.

18. The apparatus according to claim 14, further comprising a memory configured to store the image and metadata attached to the image, wherein the metadata contains the information indicating recommendation or non-recommendation and a history of execution of the predetermined image processing by the external device.

19. The apparatus according to claim 18, further comprising a display unit,
wherein the controller causes the display unit to display an image selected from one or more images stored in the memory, and causes the display unit to display, in relation to the image, the information indicating recommendation or non-recommendation and information representing the history of execution of the predetermined image processing by the external device.

20. The apparatus according to claim 14, wherein the controller causes the execution request to contain an instruction for operating the external device in a mode that executes the predetermined image processing on a partial image of the image.

* * * * *